H. L. BROWN.
Hand-Cars.
No. 5,274.
Reissued Feb. 11, 1873.
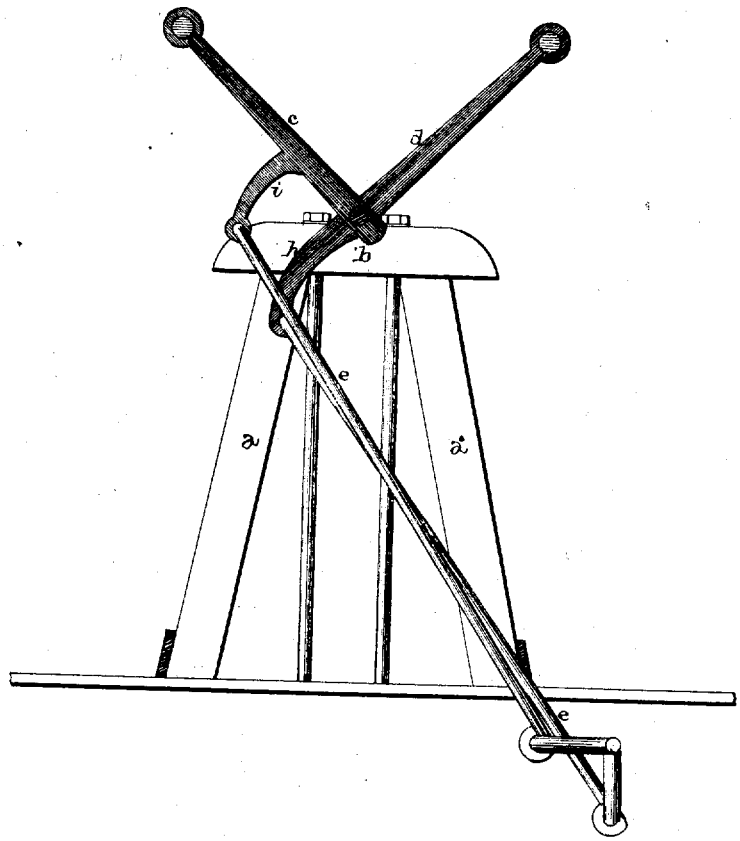
WITNESSES.
H. F. Duhamel
Alex S. Davidson.
INVENTOR.
Henry L. Brown.
Per H. S. Abbot.
atty.
AM. PHOTO-LITHOGRAPHIC CO. N.Y. (OSBORNE'S PROCESS.)

UNITED STATES PATENT OFFICE.

HENRY L. BROWN, OF ADRIAN, MICHIGAN.

IMPROVEMENT IN HAND-CARS.

Specification forming part of Letters Patent No. 94,469, dated September 7, 1869; reissue No. 5,274, dated February 11, 1873.

DIVISION B.

*To all whom it may concern:*

Be it known that I, HENRY L. BROWN, of Adrian, in the county of Lenawee and State of Michigan, have invented certain new and useful Improvements in Hand-Cars for Railroads; and I do declare that the following is a true and accurate description thereof, reference being had to the accompanying drawing and to the letters of reference marked thereon and being a part of this specification.

The nature of my invention relates to the construction of a lever-power for running hand-cars and all similar purposes; and consists in two hand-levers fulcrumed upon the same shaft, one of which has a short dependent arm near its center, so that when the two levers are extended horizontally on a plane with each other the end of this arm and the end of the other lever, to which the ends of the connecting-rods are attached, will be of the same length and upon the same side of the shaft, thus requiring less room to operate them, and making the connecting-rods by which they are attached to the double crank of the same length.

The accompanying drawing represents a side elevation of my invention.

*a* represents any suitable kind of a frame, upon the top of which the rock-shaft *b* has its bearings. To this shaft are secured the two hand-levers *c d*, the one *c* being rigidly secured thereto, and the other loosely. The lever *c*, instead of having its end projecting beyond the shaft *b*, as the other does, so as to have one of the connecting-rods *e* attached to it, has a short hanging arm, *i*, near its middle, which, when both levers are horizontal, will be just as long as the projecting end *h* of the lever *d* and upon the same side of the shaft.

By this arrangement the two levers can be worked in less space, besides other advantages which will be readily apparent to all those who have had occasion to use a lever-power.

Having thus described my invention, what I claim as new, and desire to secure by Letters Patent, is—

The combination of the levers *c d*, connecting-rods *e*, and double cranks, when the parts are arranged to operate substantially as described.

In testimony that I claim the foregoing as my invention I hereunto affix my signature this 17th day of December, 1872.

HENRY L. BROWN.

Witnesses:
H. B. RICE,
LUCIUS L. FORD.